United States Patent
Ren et al.

(10) Patent No.: US 11,743,077 B2
(45) Date of Patent: Aug. 29, 2023

(54) DISCONTINUED TRANSMISSION OF UPLINK SOUNDING REFERENCE SIGNALS

(71) Applicant: Telefonaktiebolaget LM Ericsson (publ), Stockholm (SE)

(72) Inventors: Hong Ren, Kanata (CA); Shiwei Gao, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/610,650

(22) PCT Filed: Apr. 27, 2018

(86) PCT No.: PCT/IB2018/052950
§ 371 (c)(1),
(2) Date: Nov. 4, 2019

(87) PCT Pub. No.: WO2018/203201
PCT Pub. Date: Nov. 8, 2018

(65) Prior Publication Data
US 2020/0067738 A1    Feb. 27, 2020

Related U.S. Application Data

(60) Provisional application No. 62/502,259, filed on May 5, 2017.

(51) Int. Cl.
*H04L 25/02* (2006.01)
*H04L 5/00* (2006.01)
*H04W 72/23* (2023.01)

(52) U.S. Cl.
CPC ........ *H04L 25/0224* (2013.01); *H04L 5/0023* (2013.01); *H04L 5/0048* (2013.01); *H04L 5/0053* (2013.01); *H04W 72/23* (2023.01)

(58) Field of Classification Search
CPC ............. H04W 72/04; H04W 72/0406; H04W 72/0413; H04W 72/042; H04W 72/1284;
(Continued)

(56) References Cited

U.S. PATENT DOCUMENTS

2014/0170985 A1* 6/2014 Raghavan ............. H04W 24/02
455/67.13
2014/0219152 A1* 8/2014 Anto ................... H04W 52/325
370/311
(Continued)

FOREIGN PATENT DOCUMENTS

AU    2012261509 B2    12/2012
WO    2010/104957 A2    9/2010
WO    2014/185841 A1    11/2014

OTHER PUBLICATIONS

International Search Report and Written Opinion of the International Searching Authority dated Aug. 1, 2018 issued in PCT Application No. PCT/IB2018/052950, consisting of 17 pages.
3GPP TSG RAN1 #61b, Dresden, Germany, Jun. 28-Jul. 2, 2010; R1-103620; Source: Pantech; Title: "Further Consideration on Aperiodic SRS Transmission With Holding Scheme"; Agenda Item: 6.5.2.1; Document for: Discussion, consisting of 4 pages.
(Continued)

*Primary Examiner* — Peter Chen
(74) *Attorney, Agent, or Firm* — Christopher & Weisberg, P.A.

(57) ABSTRACT

A method and user equipment configured for discontinuous transmission, DTX, of sounding reference signals, SRSs, the user equipment served by a base station in a wireless network are disclosed. In some embodiments, a method includes, when operating in a first mode of operation, the method includes comparing a change in channel conditions to a channel condition threshold and transmitting an SRS only if the change in channel conditions exceeds the channel condition threshold. When operating in a second mode of operation, the method includes determining a content of an uplink data buffer and transmitting an SRS only if the uplink data buffer is not empty.

17 Claims, 12 Drawing Sheets

(58) Field of Classification Search
CPC . H04W 72/1278; H04W 76/28; H04W 28/02; H04W 28/04; H04W 28/0278; H04L 5/0014; H04L 5/0016; H04L 5/0023; H04L 5/0048; H04L 5/0053; H04L 5/0055; H04L 25/0224; H04L 25/0226; H04L 25/0228
See application file for complete search history.

(56) References Cited

U.S. PATENT DOCUMENTS

| | | | |
|---|---|---|---|
| 2016/0037468 A1* | 2/2016 | Womack | H04W 72/0413 370/311 |
| 2016/0119915 A1* | 4/2016 | Simonsson | H04L 5/0085 370/329 |
| 2017/0288833 A1* | 10/2017 | Islam | H04W 52/36 |
| 2018/0007707 A1* | 1/2018 | Rico Alvarino | H04L 5/0096 |

OTHER PUBLICATIONS

3GPP TS 36.211 V14.1.0 (Dec. 2016); 3rd Generation Partnership Project; Technical Specification Group Radio Access Network; Evolved Universal Terrestrial Radio Access (E-UTRA); Physical Channels and Modulation (Release 14), consisting of 175 pages.
3GPP TR 38.802 V1.2.0 (Feb. 2017); 3rd Generation Partnership Project; Technical Specification Group Radio Access Network; Study on New Radio (NR) Access Technology; Physical Layer Aspects (Release 14), consisting of 83 pages.
3GPP TS 36.213 V14.1.0 (Dec. 2016); 3rd Generation Partnership Project; Technical Specification Group Radio Access Network; Evolved Universal Terrestrial Radio Access (E-UTRA); Physical Layer Procedures (Release 14), consisting of 414 pages.
Communication Pursuant to Article 94(3) EPC dated Oct. 7, 2021 issued in European Patent Application No. 18 725 654.0, consisting of 8 pages.

* cited by examiner

DISCONTINUED TRANSMISSION OF UPLINK SOUNDING REFERENCE SIGNALS

CROSS-REFERENCE TO RELATED APPLICATIONS

This application is a Submission Under 35 U.S.C. § 371 for U.S. National Stage Patent Application of International Application No.: PCT/IB2018/052950, filed Apr. 27, 2018, entitled "DISCONTINUED TRANSMISSION OF UPLINK SOUNDING REFERENCE SIGNALS," which claims priority to U.S. Provisional Application No. 62/502,259, filed May 5, 2017, entitled "DISCONTINUED TRANSMISSION OF UPLINK SOUNDING REFERENCE SIGNALS," the entireties of both of which are incorporated herein by reference.

TECHNICAL FIELD

Wireless communication and in particular, discontinuous transmission of sounding reference signals.

BACKGROUND

The next generation mobile wireless communication system (5G), also referred to as new radio (NR), will support a diverse set of use cases and a diverse set of deployment scenarios. The latter includes deployment at both low frequencies (100s of MHz), similar to long term evolution (LTE) today, and very high frequencies (mm waves in the tens of GHz).

Similar to LTE, NR will use Orthogonal Frequency Division Multiplexing (OFDM) in the downlink (i.e., from a network node, or gNB, to a wireless device (WD)). It is also referred to as CP-OFDM (Cyclic Prefix OFDM). In the uplink (i.e., from WD to gNB), both CP-OFDM and discrete Fourier transform (DFT)-spread OFDM (DFT-S-OFDM) will be supported. DFT-S-OFDM is also referred to as Single Carrier FDMA (SC-FDMA) in LTE.

The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15 \times 2^{\alpha})$ kHz where $\alpha$ is a non-negative integer.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block consists of 12 subcarriers in frequency domain.

In the time domain, downlink and uplink transmissions in NR will be organized into equally-sized subframes similar to LTE as shown in FIG. 2. In NR, the subframe length is 1 ms for all supported numerologies. A subframe is further divided into a number of slots of equal duration. The number of slots per subframe is $2^{\alpha}$ for $\Delta f=(15 \times 2^{\alpha})$ kHz. For convenience, the term subframe is used throughout the following sections. However, it is understood that a subframe may be further divided into a number of slots, and the discussions based on subframes may equally be applicable to slots.

Downlink transmissions are dynamically scheduled, i.e., in each slot the gNB transmits downlink control information (DCI) about which WD data is to be transmitted to and which resource blocks in the current downlink subframe the data is transmitted on. This control signaling is typically transmitted in the first few OFDM symbols in each slot in NR. The control information is carried on the Physical Downlink Control Channel (PDCCH) and data is carried on the Physical Downlink Shared Channel (PDSCH). A WD first detects and decodes the PDCCH and if the PDCCH is decoded successfully, the WD then decodes the corresponding PDSCH based on the decoded control information in the PDCCH.

Uplink data transmissions are also dynamically scheduled using PDCCH. Similar to downlink, a WD first decodes uplink grants in the PDCCH and then transmits data over the Physical Uplink Shared Channel (PUSCH) based on the decoded control information in the uplink grant such as modulation order, coding rate, uplink resource allocation, etc.

In addition to the PUSCH, the Physical Uplink Control Channel (PUCCH) is also supported in NR to carry uplink control information (UCI) such as HARQ (Hybrid Automatic Repeat Request) related Acknowledgement (ACK), Negative Acknowledgement (NACK), or Channel State Information (CSI) feedback.

Similar to LTE, PUCCH resources may be pre-allocated in a cell and shared by all WDs.

In LTE, a number of reference signals (RS) are defined for downlink channel estimation. By measuring a RS, a WD can estimate the effective channel the RS is traversing, including the downlink radio propagation channel and both transmit and receive antenna gains. In a more mathematical sense, this implies that if a known RS signal $x_i$ ($i=1, 2, \ldots, N_{tx}$) is transmitted on the ith transmit antenna port of a network node at a time-frequency resource element, the received signal $y_j$ ($j=1, 2, \ldots, N_{rx}$) on the jth receive antenna port of a WD at the same time-frequency resource element can be expressed as $$y_j = h_{i,j} x_i + n_j$$

where $h_{i,j}$ is the effective channel between the ith transmit antenna port and the jth receive antenna port at the time-frequency resource element, $n_j$ is the receiver noise associated with the jth receive antenna port, $N_{tx}$ is the number of transmit antenna ports at the network node and $N_{rx}$ is the number of receive antenna ports at the WD.

A WD can estimate the $N_{rx} \times N_{tx}$ effective channel matrix H ($H(i,j)=h_{i,j}$) for each time-frequency element over which a RS is transmitted. The effective channel can thus be estimated over a physical resource block (PRB), a subband (e.g., a few PRBs), or the whole system bandwidth (i.e., wideband).

For channel state information (CSI) feedback purposes, the channel rank, precoding matrix, and channel quality can be estimated based on the estimated channel. This is typically achieved by using a predesigned codebook for each rank, with each codeword in the codebook being a precoding matrix candidate. A WD searches through the codebook to find a rank, a codeword associated with the rank, and channel quality associated with the rank and precoding matrix to best match the effective channel. The rank, the precoding matrix and the channel quality estimation can be determined per subband and/or wideband and reported in the form of a rank indicator (RI), a precoding matrix indicator (PMI) and a channel quality indicator (CQI).

The reference signals (RS) for downlink channel estimation purposes include:

Cell Specific Reference Signal (CRS): CRSs are transmitted in every subframe and over the entire frequency band. Up to four CRS ports are supported in LTE, each associated with one antenna port. CRSs are transmitted on a grid of resource elements (REs) in each PRB. An example of the CRS RE locations in a PRB is shown in FIG. 3. The frequency locations of the CRS resource elements (Res) are cell dependent and may be shifted for cells with different physical cell identifications (IDs).

Channel State Information Reference signal (CSI-RS): In LTE Release-10, a new reference signal was introduced for channel state information (CSI) estimation. The CSI-RS provides several advantages over CRS. First, the CSI-RS is not used for demodulation of the data signal, and thus does not require the same density per PRB as CRS. Therefore, the overhead of the CSI-RS is substantially less. Second, CSI-RS provides a much more flexible means to configure CSI feedback measurements, i.e., which CSI-RS resource to measure on can be configured in a WD specific manner. In addition, up to 32 antenna ports can be supported by CSI-RS. CSI-RS is transmitted over the whole system bandwidth. In the time domain, CSI-RS can be transmitted periodically with preconfigured periodicity and subframe offset. CSI-RS can also be transmitted aperiodically, in which CSI-RS transmission is triggered dynamically by a downlink control information (DCI).

Demodulation reference signal (DMRS): DMRS is also used for downlink channel estimation but mainly for data demodulations. Unlike CRS, DMRS transmission is WD specific, i.e., the DMRS is only transmitted when there is a DL data transmission to a WD. There are eight DMRS ports (ports 7 to 15) defined in LTE and up to eight layers (rank=8) of data can be supported. The DMRS port used is dynamically indicated in the associated PDCCH. The DRMSs are transmitted on certain fixed REs in a PRB. The RE pattern for port 7 and port 8 are shown in FIG. 3. Ports 7 and 8 occupy the same REs in a PRB and are multiplexed with orthogonal codes. DMRS is precoded with the same precoder as the data.

There is one reference signal transmitted per antenna port. An antenna port is defined such that the channel over which a symbol on the antenna port is conveyed can be inferred from the channel over which another symbol on the same antenna port is conveyed.

Similar to LTE, CSI-RS and DMRS will also be supported in NR for downlink channel estimation. In addition to periodic and aperiodic CSI-RS, semi-persistent CSI-RS transmission will also be supported in NR, in which CSI-RS transmission is dynamically activated and deactivated.

The sounding reference symbol (SRS) is used for uplink channel quality measurements for frequency-selective scheduling and link adaption. The SRS is also used for uplink timing estimation. In time division duplex (TDD) systems, the SRS can also be used to estimate the downlink channel since the same carrier frequency is used in both downlink and uplink.

In LTE, the SRS is only transmitted by a WD in the last OFDM symbol of a subframe configured for SRS transmission for the WD. The location of the RS in a PRB in a SRS subframe is shown in FIG. 4, where DMRS are used for channel estimation in PUSCH demodulation.

The subframes in which SRS transmission can occur in a cell are referred to as cell specific SRS subframes. A WD can be configured to transmit SRS on a subset of the cell specific SRS subframes. An example is shown in FIG. 5.

A WD can be configured with different SRS bandwidths. In general, two kinds of sounding bandwidths are supported, one is wideband and the other is narrow band. In case of wideband, channel measurement over the full system bandwidth can be performed in a single subframe, while in narrow band sounding, only part of the full system bandwidth can be measured in a subframe. Thus, in narrow band sounding, multiple SRS subframes are needed for a full bandwidth channel measurement. Frequency hopping is supported for narrowband SRS so that different parts of the frequency band can be measured in different subframes.

Furthermore, two types of sounding are supported: periodic (also referred to as type 0) and aperiodic (also referred to as type 1) in LTE. In case of periodic SRS, a WD transmits SRS periodically at certain configured SRS subframes. In case of aperiodic SRS, a WD transmits SRS only when it is requested by the eNB. The SRS subframes for periodic and aperiodic SRS are separately configured for a WD, both are within the cell specific SRS subframes.

The SRS bandwidth for a WD is configurable and is in the multiple of 4 PRBs. The minimum SRS bandwidth is 4 PRBs, which is also referred to as an SRS subband. An example is shown in FIG. 6.

In case of narrowband SRS with frequency hopping (FH), an SRS is transmitted on different parts of the system bandwidth at different SRS subframes. For example, for a 10 MHz system and an SRS bandwidth of 4 PRBs, a possible set of locations in the frequency domain for SRS transmission are shown in FIG. 7. In this example, the whole bandwidth can be measured after 12 SRS subframes.

An SRS signal is a phase-shifted Zadoff-Chu sequence. Different WDs can be multiplexed on the same time-frequency resources by assigning different phase shifts, known as cyclic shifts (CS). There are 8 cyclic shifts defined. In addition, an SRS signal is only transmitted on half of the subcarriers in the configured SRS bandwidth, either even-numbered or odd-numbered subcarriers, configurable through a parameter called comb. This is also referred to as Interleaved Frequency Division Multiple Access (IFDMA) with a repetition factor of 2. Therefore, up to 16 WDs can be multiplexed on the same SRS bandwidth.

In LTE standard Rel.13, support for 4-comb was also introduced, which means that a SRS signal can be mapped to every $4^{th}$ subcarrier, thereby increasing the SRS multiplexing capacity provided that the channel is sufficiently flat so that every $4^{th}$ subcarrier is adequate.

WDs with different SRS bandwidths can be multiplexed on a SRS subframe with different comb values. WDs with the same SRS bandwidth can be multiplexed in an SRS subframe with different cyclic shifts.

SRS will also be supported in NR for uplink channel sounding. Similar to LTE, configurable SRS bandwidth is supported. SRS can be configurable with regard to density in the frequency domain (e.g., comb levels) and/or in the time domain (including multi-symbol SRS transmissions).

In addition to full band size, partial band size is also supported in NR, which is smaller than the largest transmission bandwidth supported by the WD. For the full band size, the size is equal to the largest transmission bandwidth supported by the WD.

Aperiodic SRS transmission triggered by the network is supported in NR. The triggering is generally done through DCI, dynamically. Periodic and semi-persistent NR-SRS transmissions are also supported in NR.

In NR, an SRS resource comprises of a set of resource elements (REs) within a time duration and frequency span and N antenna ports (N≥1). A WD can be configured with K≥1 NR-SRS resources. The maximum value of K is considered to be a WD capability.

Out of K≥1 configured NR-SRS resources, for aperiodic transmission, the WD can be configured to transmit a subset of or all K NR-SRS resources.

For periodic and semi-persistent transmission, out of K≥1 configured SRS resources, the WD can be configured to transmit K SRS resources.

When periodic SRS is configured, a WD needs to transmit SRS periodically in the uplink in the configured subframe, regardless of whether the uplink channel has changed or not, and regardless of whether there is uplink data in its buffer to transmit or not. If the channel remains the same or if there is no uplink data to transmit, continuously transmitting SRS would drain WD battery power and also cause unnecessary interference to other WDs.

SUMMARY

Some embodiments advantageously provide a method and wireless device for periodic SRS. When configured for a WD, the WD may not transmit SRS in its configured SRS sub-frames when the downlink (DL) channel doesn't change much over a period of time for the PRBs the WD is going to sound. Specifically, in some embodiments, the criterion and the threshold for downlink (DL) channel change can be controlled and signaled by the network node or pre-specified. Before the WD transmits SRSs, the WD evaluates the DL channel change over the period of time on the PRBs it is going to sound. If the change is not greater than the configured threshold, the WD doesn't transmit SRS.

In some embodiments, when periodic SRS is configured for a WD, the WD may not transmit SRS in its configured SRS sub-frames when the downlink (DL) channel doesn't change much for the PRBs the WD is going to sound. Specifically, the criterion and the threshold for DL channel change can be controlled and signaled by eNB or pre-specified. Before the WD transmits SRSs, the WD evaluates the DL channel change over the PRBs it is going to sound. If the change is not greater than the configured threshold, the WD doesn't transmit SRS.

In some embodiments, a WD may not transmit SRS in its configured SRS subframe when the WD doesn't have data to transmit in the UL. The WD decides whether to transmit SRS based on factors such as the priorities of uplink (UL) logical channels. This is mostly useful in case of a frequency division duplex (FDD) system, where SRS is not used for DL channel estimation.

Alternatively, instead of stopping the SRS transmission completely, the WD may transmit SRS less frequently (i.e., transmit only on a subset of the configured SRS subframes).

A SRS DTX mode may be defined and configured for a WD. When it is enabled by the network node, SRS may not be transmitted by the WD or transmitted with less frequently than configured if one or more of the following conditions are satisfied:

The WD is configured with periodic SRS in a TDD system, and the DL channel has not been changed, or the change is below a predefined threshold, since last time a SRS is transmitted.

The WD is configured with periodic SRS in a FDD system, and there is no UL data to transmit by the WD.

The WD is configured with periodic SRS in a FDD system, and there is no UL data to transmit by the WD and no UL logical channel has a priority greater than a priority threshold.

The channel may be represented by wideband and/or subband channel quality indicator (CQI), a rank indicator (RI) and wideband and/or subband precoding matrix indicator (PMI).

The network node performs SRS discontinuous transmission (DTX) detection in each configured WD specific SRS subframe to determine whether SRS is transmitted or not. If a SRS DTX is detected, the network node would not perform uplink and/or downlink channel estimation for the WD in the subframe.

In some embodiments, a method of discontinuous transmission, DTX, of sounding reference signals, SRSs, by a user equipment served by a base station in a wireless network is provided. When operating in a first mode of operation, the method includes comparing a change in channel conditions to a channel condition threshold and transmitting an SRS only if the change in channel conditions exceeds the channel condition threshold. When operating in a second mode of operation, the method includes determining a content of an uplink data buffer and transmitting an SRS only if the uplink data buffer is not empty.

In some embodiments, channel conditions involved in the comparison include a channel condition measured in a first previous subframe and a channel condition measured in a second previous subframe subsequent to the first previous subframe. In some embodiments, the change in channel conditions is a difference between the channel condition measured in the first previous subframe and the channel condition measured in the second previous subframe. In some embodiments, the channel conditions in the first and second previous subframes are measured based on a same set of downlink reference symbols. In some embodiments, the transmitting of the SRS only occurs if a time since a last SRS transmission exceeds a time threshold. In some embodiments, the time threshold and the channel condition threshold are signaled from the base station 16. In some embodiments, a measure of the channel conditions is at least one of a channel quality indicator, a rank indictor and a precoding matrix indicator. In some embodiments, the SRS transmission occurs only when one of there is data in the uplink buffer and a time since a last SRS transmission exceeds a time threshold. In some embodiments, the SRS transmission occurs when an uplink logical channel priority exceeds a priority threshold.

In some embodiments, a user equipment configured for discontinuous transmission, DTX, of sounding reference signals, SRSs, the user equipment served by a base station in a wireless network, is provided. The user equipment includes processing circuitry configured to operate in at least one of two modes. When operating in a first mode of operation, the processor is configured to compare a change in channel conditions to a channel condition threshold and transmit an SRS only if the change in channel conditions exceeds the channel condition threshold. When operating in a second mode of operation, the processor is configured to determine a content of an uplink data buffer and transmit an SRS only if the uplink data buffer is not empty.

In some embodiments, channel conditions involved in the comparison include a channel condition measured in a first previous subframe and a channel condition measured in a second previous subframe subsequent to the first previous subframe. In some embodiments, the change in channel conditions is a difference between the channel condition measured in the first previous subframe and the channel condition measured in the second previous subframe. In some embodiments, the channel conditions in the first and second previous subframes are measured based on a same set of downlink reference symbols. In some embodiments, the transmitting of the SRS only occurs if a time since a last SRS transmission exceeds a time threshold. In some embodiments, the time threshold and the channel condition threshold are signaled from the base station. In some embodiments, a measure of the channel conditions is at least one of a channel quality indicator, a rank indictor and a precoding matrix indicator. In some embodiments, the SRS transmission occurs only when one of there is data in the uplink buffer and a time since a last SRS transmission exceeds a time threshold. In some embodiments, the SRS transmission occurs when an uplink logical channel priority exceeds a priority threshold.

In some embodiments, a user equipment configured for discontinuous transmission, DTX, of sounding reference signals, SRSs, the user equipment served by a base station in a wireless network, is provided. The user equipment includes at least one of a channel condition comparator module configured to compare a change in channel conditions to a channel condition threshold and a content determiner module configured to determine a content of an uplink data buffer. The user equipment also includes a transceiver module configured to one of transmit an SRS only if the change in channel conditions exceeds the channel condition threshold, and transmit an SRS only if the uplink data buffer is not empty.

According to this aspect, in some embodiments, the transmitting of the SRS only occurs if a time since a last SRS transmission exceeds a time threshold. In some embodiments, the time threshold and the channel condition threshold are signaled from the base station. In some embodiments, the SRS transmission occurs only when one of there is data in the uplink buffer or a time since a last SRS transmission exceeds a time threshold. In some embodiments, the SRS transmission occurs when an uplink logical channel priority exceeds a priority threshold.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
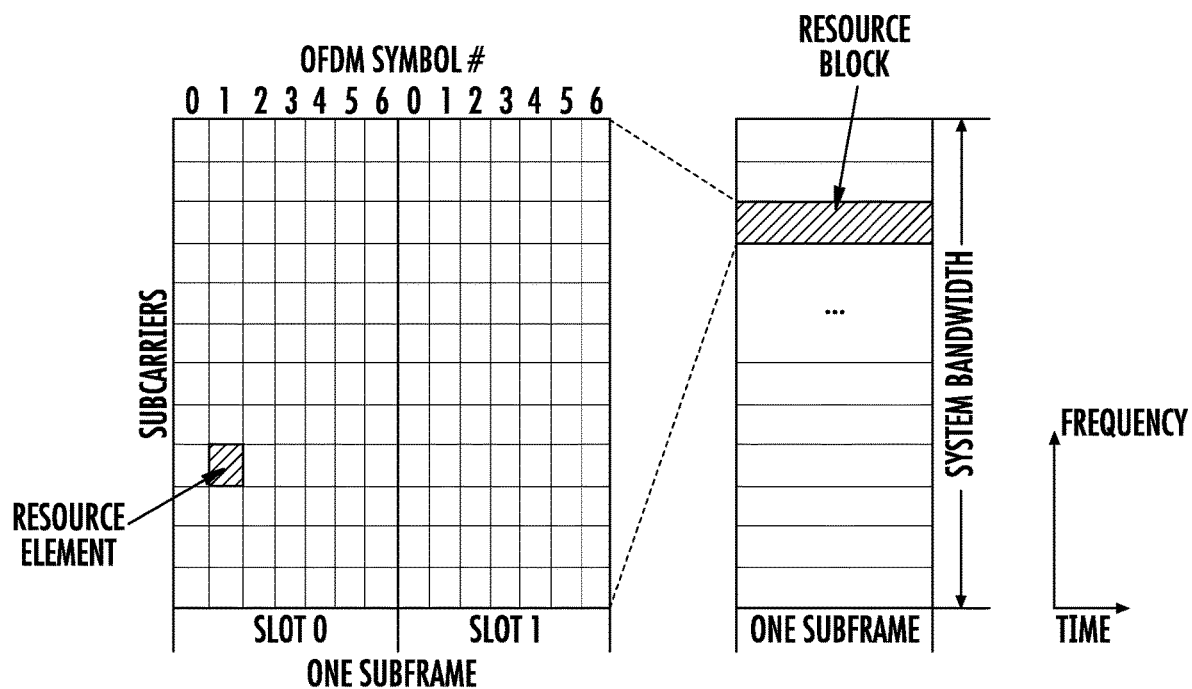
FIG. 1 is a time-frequency grid where each resource element corresponds to one OFDM subcarrier during one OFDM symbol interval.
Figure 2:
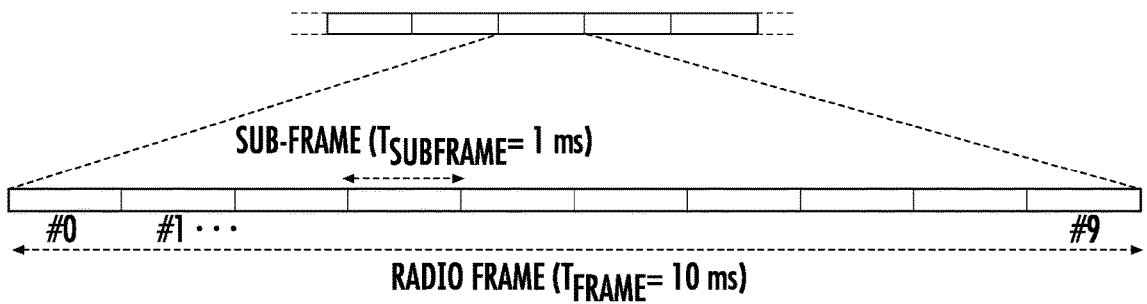
FIG. 2 illustrates equally sized subframes of 1 ms length.
Figure 3:
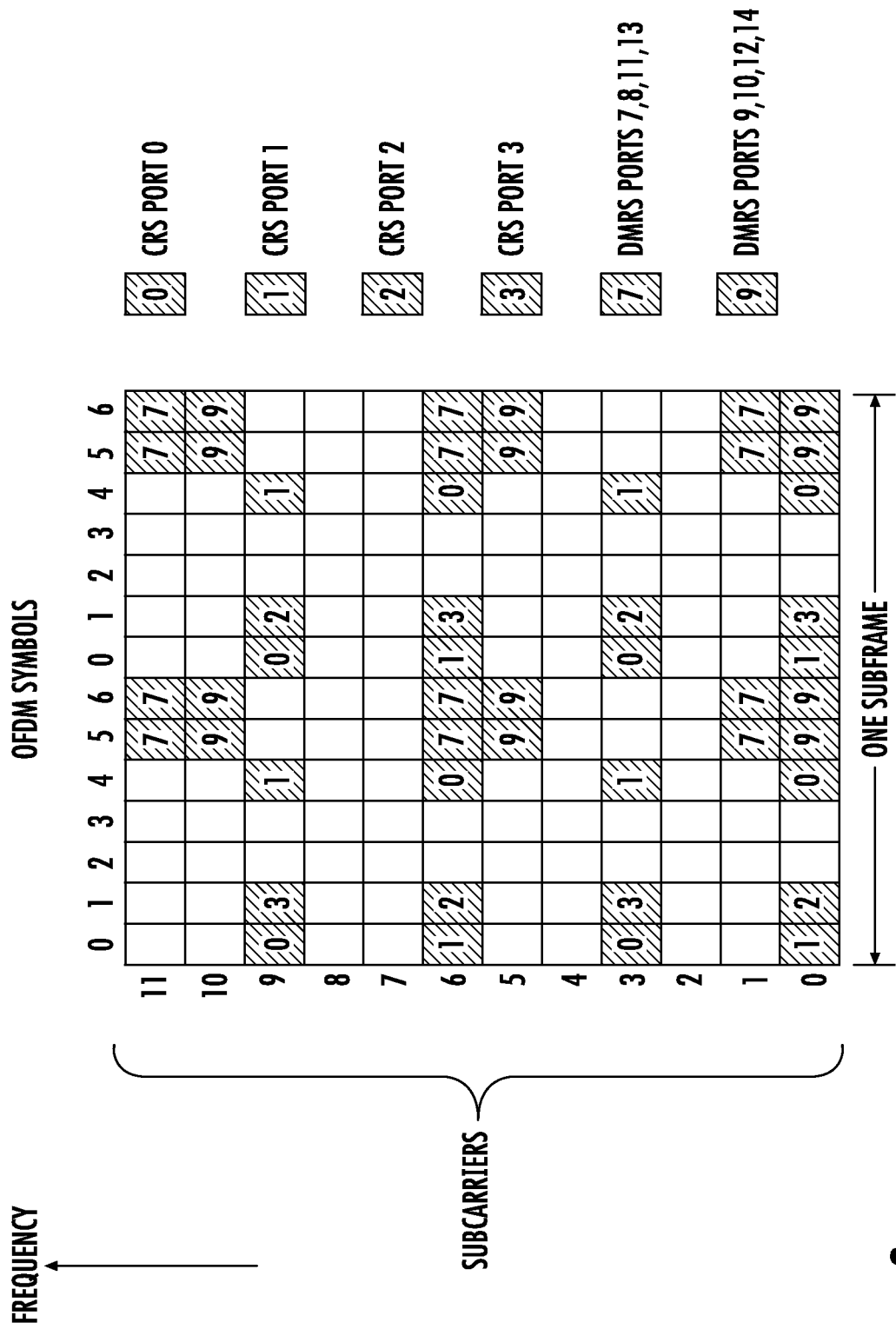
FIG. 3 illustrates CRS RE locations in a PRB in the downlink.
Figure 4:
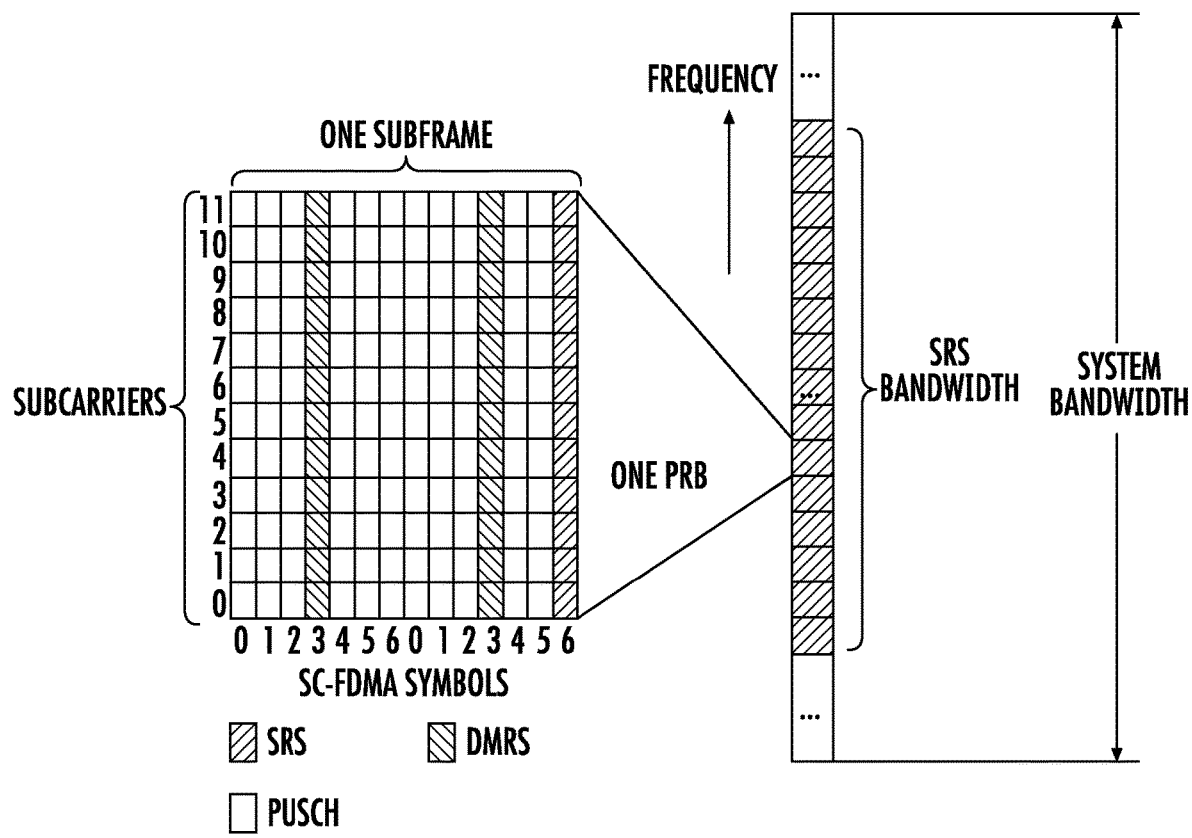
FIG. 4 illustrates an RE pattern in the uplink.
Figure 5:
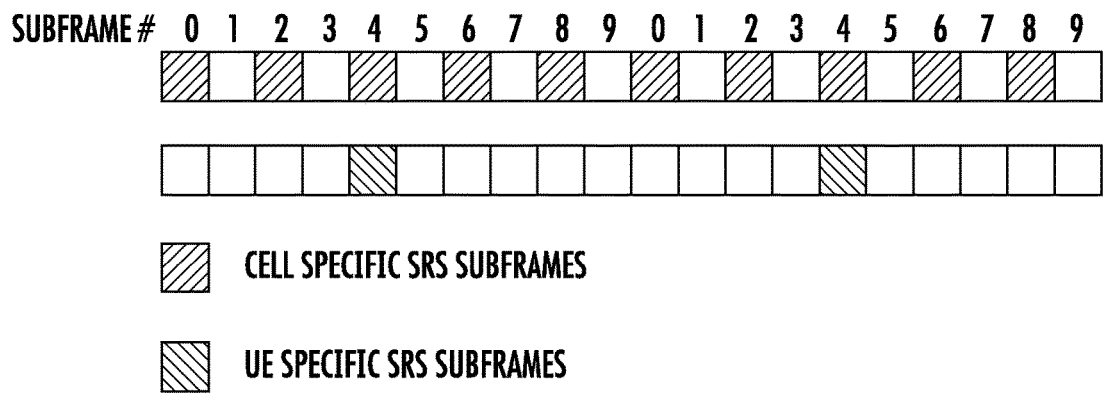
FIG. 5 illustrates cell specific SRS subframes in the uplink.
Figure 6:
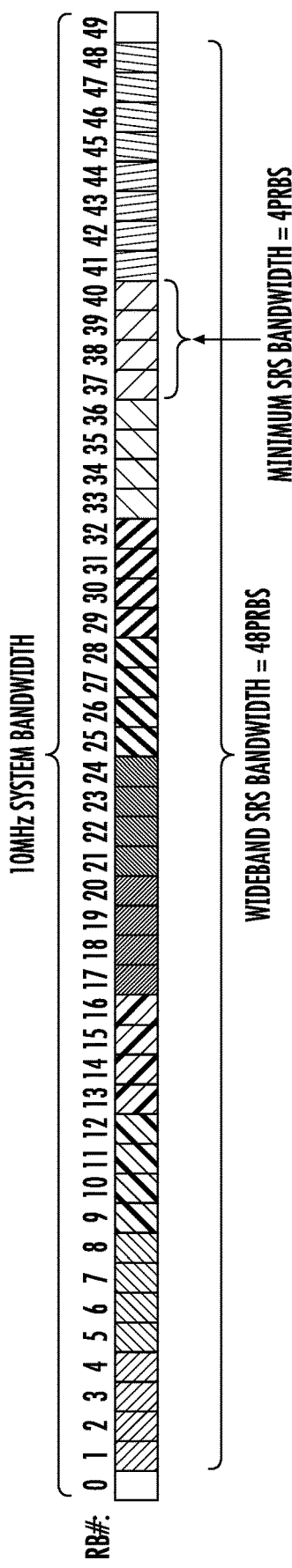
FIG. 6 illustrates SRS bandwidth configurable in multiples of 4 PRBs.
Figure 7:
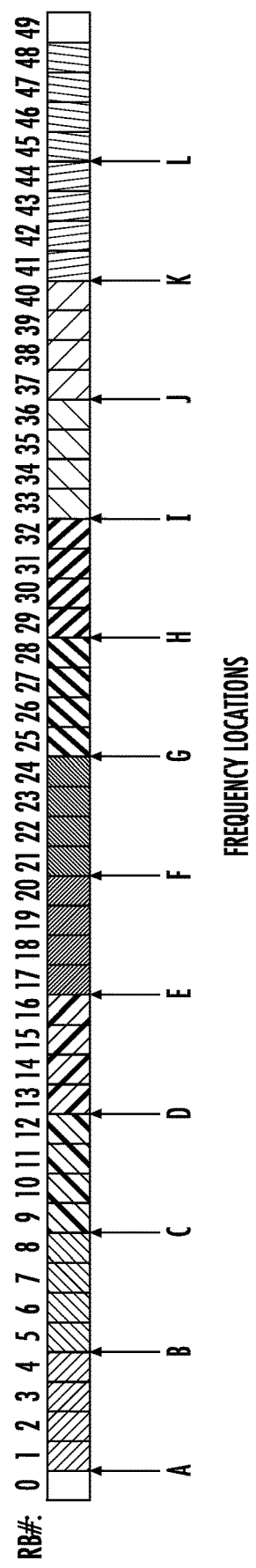
FIG. 7 illustrates a possible set of locations in the frequency domain for SRS transmission.

Before describing in detail exemplary embodiments, it is noted that the embodiments reside primarily in combinations of apparatus components and processing steps related to discontinuous transmission of sounding reference signals. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide methods and wireless device that operate in one of several SRS discontinuous transmission modes. According to one mode, whether to transmit an SRS is based on whether there is a change in channel conditions exceeding a threshold. In another mode, whether to transmit an SRS is based on whether there is data in an uplink data buffer.

Figure 8:
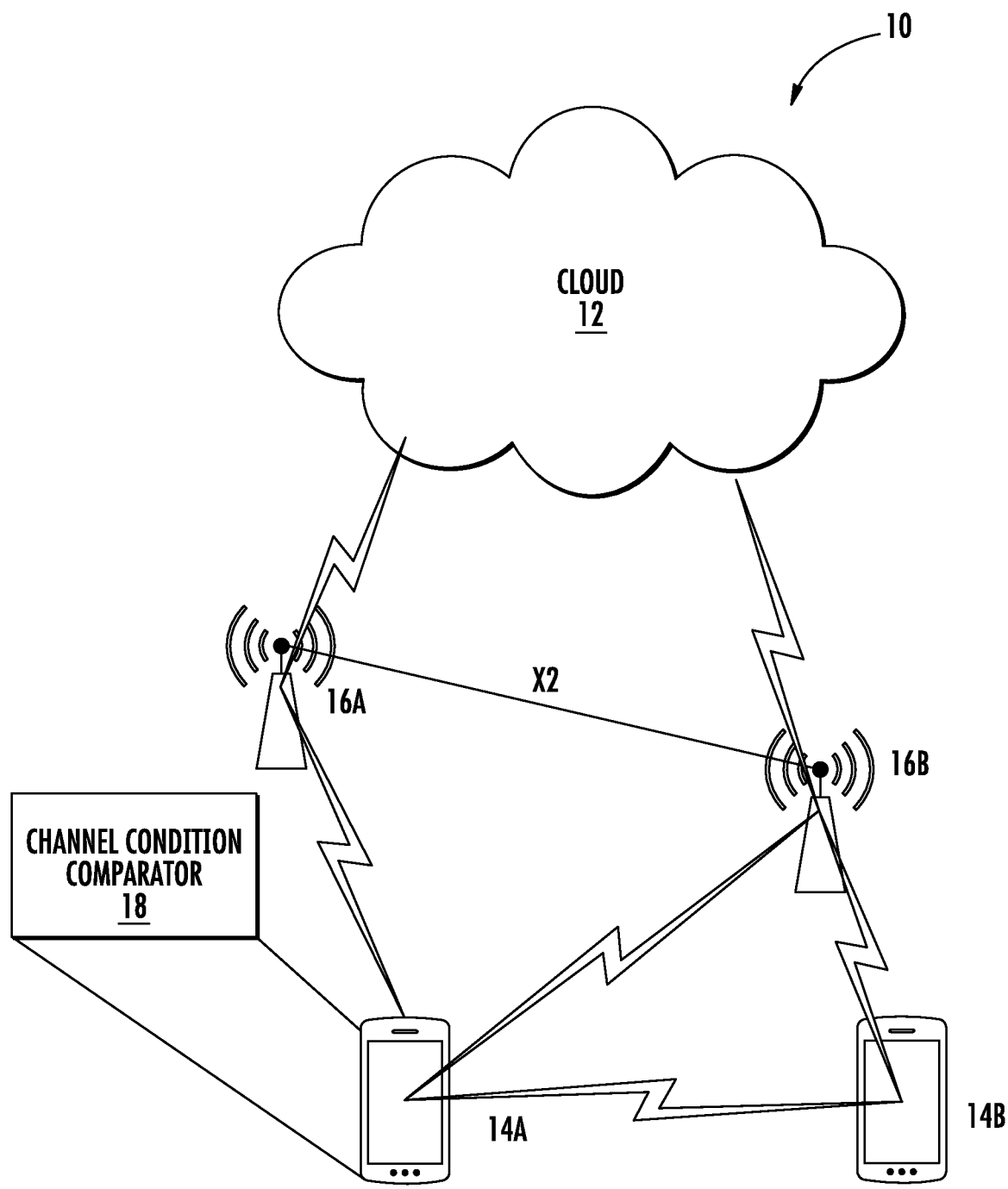
FIG. 8 is a block diagram of a wireless communication network constructed in accordance with principles set forth herein.

FIG. 8 is a block diagram of a wireless communication network 10 constructed in accordance with principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more wireless device 14A and 14B, referred to collectively herein as wireless device 14. Network nodes 16A and 16B, serve wireless device 14, and are referred to collectively as network nodes 16. Note that, although only two wireless devices 14 and two network nodes 16 are shown for convenience, the wireless communication network 10 may typically include many more wireless device (WDs) 14 and network nodes 16. Further, in some embodiments, WDs 14 may communicate directly using what is sometimes referred to as a side link connection.

The term "wireless device" or mobile terminal used herein may refer to any type of wireless device communicating with a network node 16 and/or with another wireless device 14 in a cellular or mobile communication system 10. Examples of a wireless device 14 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by the network node 16, it is understood that the functions can be performed in other network nodes and elements. It is also understood that the functions of the network node 16 can be distributed across network cloud 12 so that other nodes can perform one or more functions or even parts of functions described herein.

Figure 9:
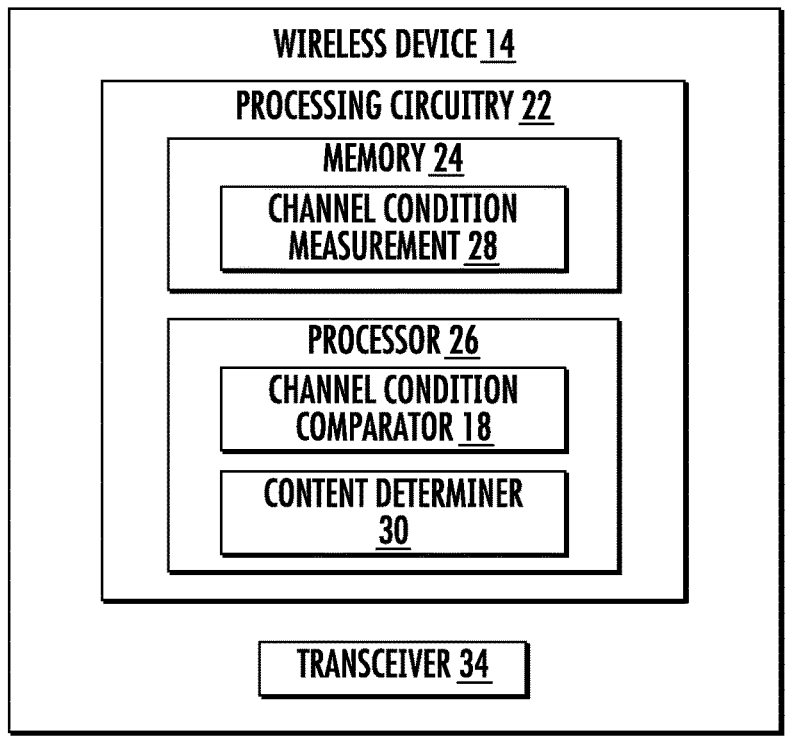
FIG. 9 is a block diagram of a wireless device constructed in accordance with principles set forth herein.

As shown in FIG. 8, a wireless device 14 may include a channel condition comparator 18 configured to compare past channel conditions to a channel condition threshold to determine whether to transmit an SRS. FIG. 9 is a block diagram of a wireless device 14 constructed in accordance with principles set forth herein. The wireless device 14 includes processing circuitry 22. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store channel condition measurements such as a channel quality indicator, a rank indictor and/or a precoding matrix indicator. The processor 26 is configured to implement the channel condition comparator 18 and a content determiner 30. The channel condition comparator 18 is configured to compare a change in channel conditions to a channel condition threshold. The content determiner 30 is configured to determine a content of an uplink data buffer.

The wireless device 14 also includes a transceiver 34 configured to transmit an SRS only when certain conditions exist. In one mode of operation, the transceiver 34 is configured to transmit an SRS only if the change in channel conditions exceeds the channel condition threshold. In another mode of operation, the transceiver 34 is configured to transmit an SRS only if the uplink data buffer is not empty.

Figure 10:
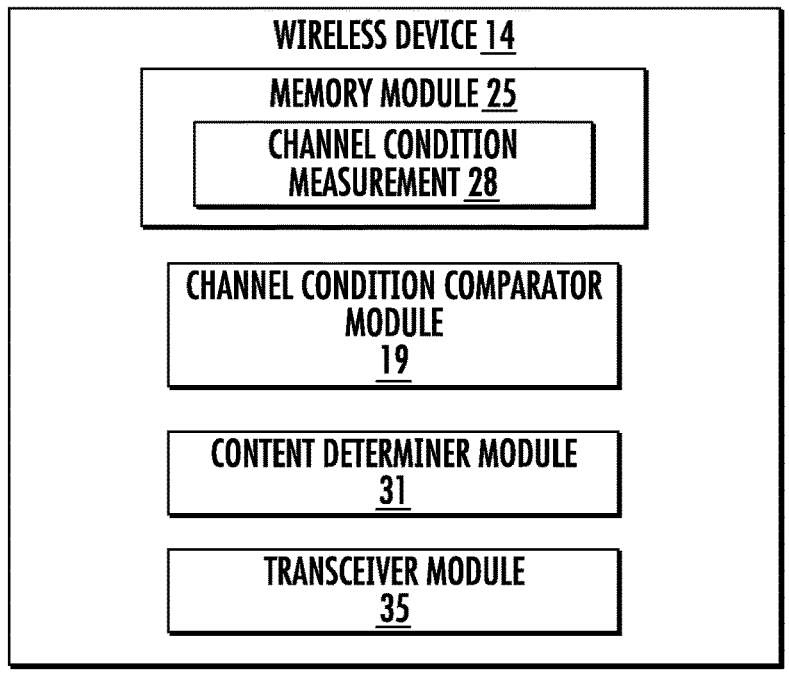
FIG. 10 is an alternative embodiment of wireless device constructed in accordance with principles set forth herein.

FIG. 10 is an alternative embodiment of wireless device 14 constructed in accordance with principles set forth herein. The memory module 25 stores the channel condition measurements 28. The channel condition comparator module 19 may be implemented in software that when executed by a processor causes the processor to perform the function of comparing a change in channel conditions to a channel condition threshold. The content determiner module 31 may be implemented in software that when executed by a processor causes the processor to perform the function of determining a content of an uplink data buffer. The transceiver module 35 is configured to one of transmit an SRS only if the change in channel conditions exceeds the channel condition threshold and transmit an SRS only if the uplink data buffer is not empty.

Certain example embodiments are now described in detail in order to expand on the general functions and descriptions provided above.

Embodiment 1: Discontinued SRS Transmission Based on DL Channel Conditions

In this embodiment, a WD 14 is configured to transmit SRS periodically in the uplink. The SRS is used by network node 16 for estimating DL channels based on channel reciprocity between downlink and uplink such as in a time division duplex (TDD) system. The WD 14 may stop SRS transmission in a configured uplink SRS subframe when certain conditions are met. This will be referred to as discontinued SRS transmission.

In one embodiment, discontinued SRS transmission can be enabled or disabled by the network node 16 through higher layer signaling. The criteria to be used by the WD 14 can be either predefined or configured by the network node 16.

In one embodiment, the condition or criterion is related to DL channel variations. When the DL channel experienced by the WD 14 has not changed by a certain amount since the most recent SRS transmission, the WD 14 will not transmit SRS in the next SRS subframe. In other words, if the channel change does not exceed a threshold, the WD 14 will not transmit SRS in the next SRS subframe. The threshold can be either predefined or signaled to the WD. The channel change represents the difference between the new channel estimation and the reference channel estimation. The reference channel estimation is obtained when SRS is transmitted or before SRS is transmitted. If WD performs channel estimation in multiple subframes between SRS subframes, the new channel estimation can be the last channel estimation before the next SRS subframe or any channel estimation between the two SRS subframes.

Figure 11:
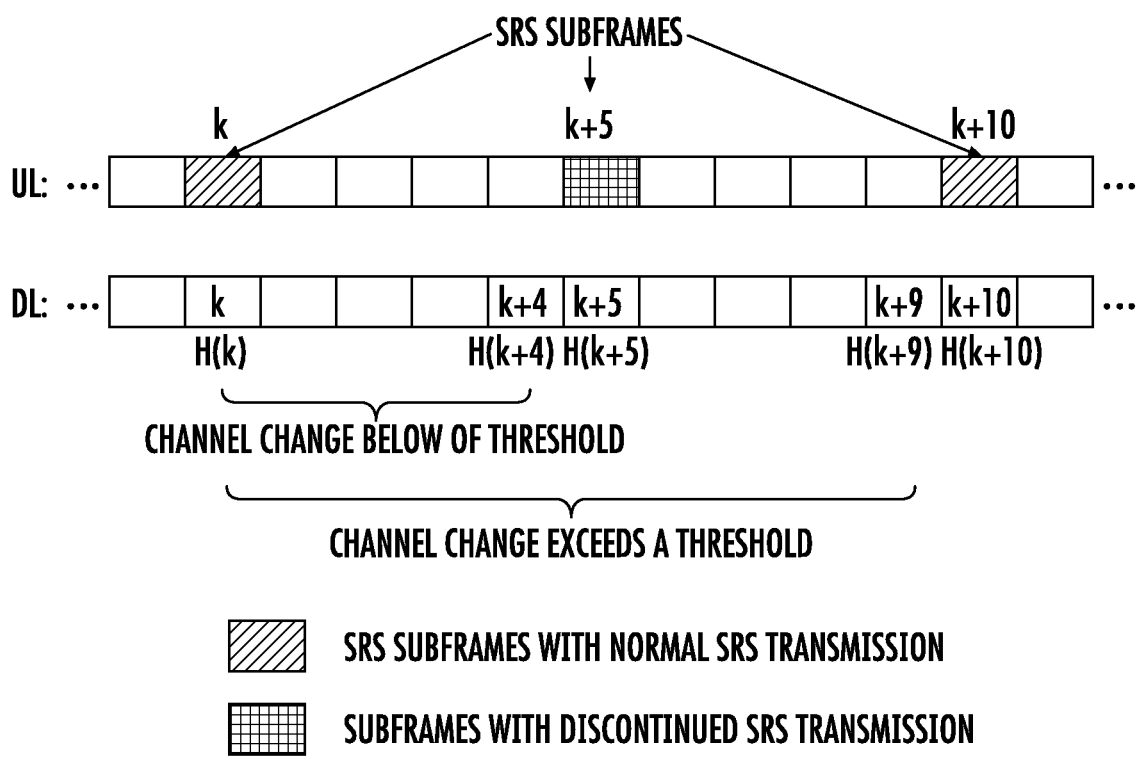
FIG. 11 is a timing diagram of SRS transmissions.

An example is shown in FIG. 11, where periodic SRS is configured for a WD 14 on subframes k+5i (i=0, 1, 2, ... ). Suppose the WD 14 transmits the SRS in subframe k. The WD 14 does not transmit the SRS in subframe k+5 if the change of downlink channel between subframes k to k+5 is below a predefined threshold, i.e., $$\frac{\|H(k, f) - H(k-i, f)\|^2}{\|H(k, f)\|^2} < \delta_h \ (i = 1, 2, 3, 4) \text{ for all } f \text{ values}$$

where H(k,f) and H(k+i, f) are the downlink channel estimations at frequency f (which corresponds to a subband or a PRB or a sub-carrier) and at subframe k and k+i, respectively; $\delta_h$ is a threshold, and $\|x\|^2$ indicates the norm of matrix x. The downlink channel change evaluation is performed over the PRBs the WD will sound in subframe k+5. The WD 14 transmits SRS in subframe k+10 if the change of downlink channel in subframes k+5 to k+9 exceeds the predefined threshold, i.e., $$\frac{\|H(k, f) - H(k+5+i, f)\|^2}{\|H(k, f)\|^2} \geq \delta_h,$$

i∈{0,1,2,3,4} for some f values that are within the PRBs the WD is going to sound in subframe k+10. Here, because SRS is not transmitted in subframe k+5, the channel at subframe k is used as the reference for calculating the channel changes for determining whether SRS should be transmitted in subframe k+10. So the WD keeps channel H(k,f) as a reference if SRS is not transmitted in the following SRS subframe(s). If SRS is transmitted in the following SRS subframe, k+5, for example, then the channel reference is updated with a new channel estimation at subframe K+5, H(k+5,f), or a subframe prior to subframe k+5 at which a channel estimation is available.

Figure 12:
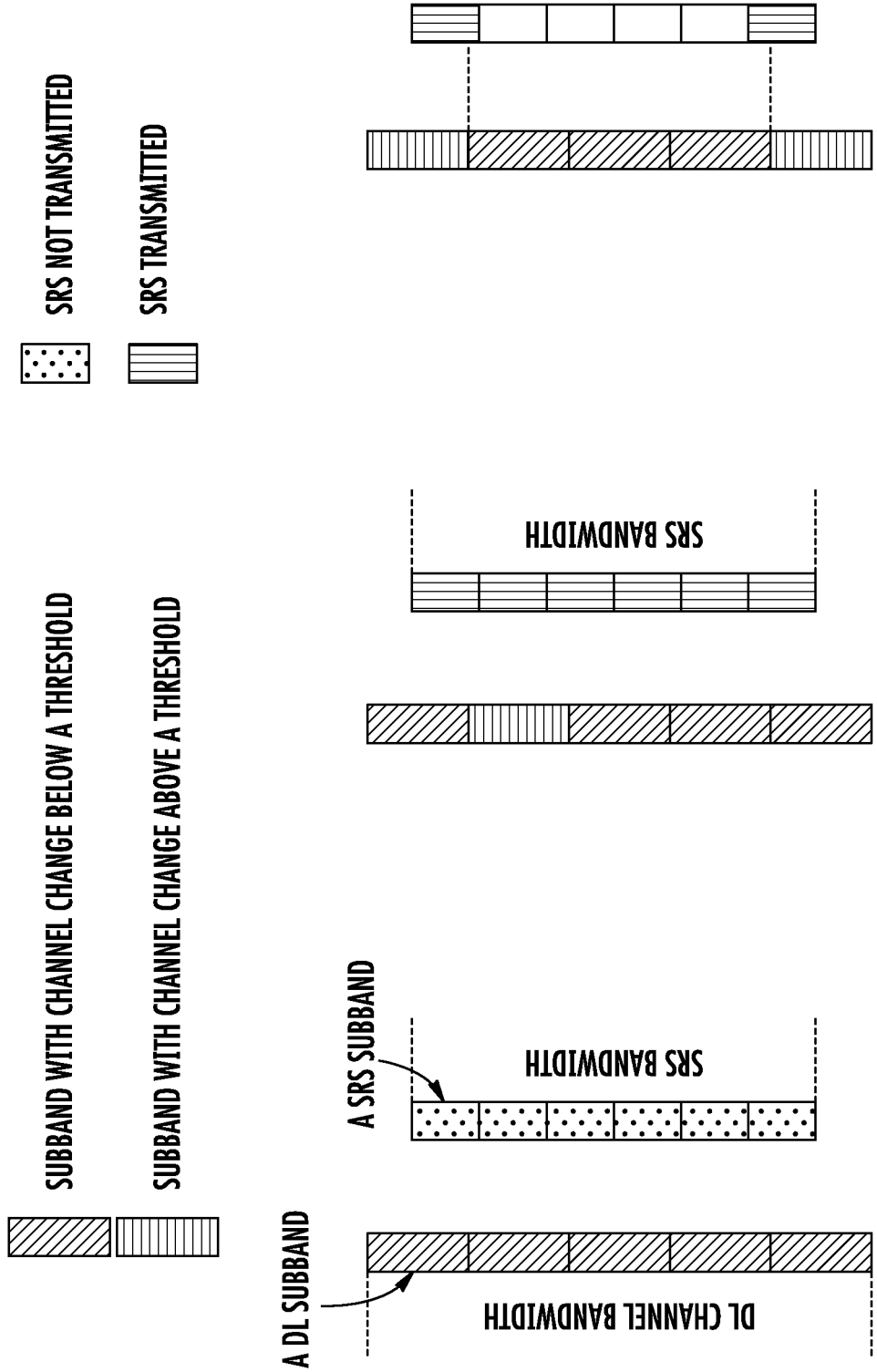
FIGS. 12A, 12B and 12C illustrate three scenarios for SRS DTX.

An example is shown in FIGS. 12A, 12B and 12C where three scenarios are illustrated. In the scenario of FIG. 12A, the change of a DL channel in all subbands is below a pre-defined or configured threshold. Therefore, the SRS is not transmitted in any SRS subband. In the scenario of FIG. 12B, the DL channel change in one subband is above a pre-defined or configured threshold and SRS is transmitted in all subbands. So, in the scenarios of FIGS. 12A and 12B, SRS is either transmitted or not transmitted at all in a subframe depending on the DL channel conditions. In the scenario of FIG. 12C, SRS is transmitted in some subbands when the change of DL channel in the corresponding subbands (i.e., the subbands contain PRBs that fully overlap with the SRS subband) is above the threshold, while SRS is not transmitted in other subbands when the corresponding DL channel changes are not above the threshold. Thus, the decision as to whether to transmit SRS is made in a per SRS subband basis.

The WD 14 monitors the downlink channel continuously. The DL channel estimation can be based on various DL reference signals (RS), including cell specific RS (CRS), channel state information RS (CSI-RS), or demodulation RS (DMRS). In some embodiments, every time the SRS is transmitted, the WD 14 records or stores the estimated DL channel. Before the next SRS transmission time, the WD 14 compares its latest estimated DL channel over the PRBs over which SRS to be transmitted with the last recorded or stored DL channel for those PRBs.

Depending on the availability of the reference signals (e.g. CSI-RS or DMRS) in a subframe, the channel estimation may not be available in every subframe. For example, if H(k,f) is not available in FIG. 11, then a channel estimation in a subframe prior to subframe k may be used, e.g.

$$\frac{1}{N_f} \sum_f \frac{\|H(k-m, f) - H(k+i, f)\|^2}{\|H(k-m, f)\|^2} < \delta_h \ (i = 1, 2, 3, 4; m > 0).$$

If channel estimation is not available in all subframes between two adjacent SRS subframes, then the WD 14 should transmit the SRS in the next SRS subframe. For example, if H(k+5) to H(k+9) are not available in FIG. 11, then SRS would be transmitted in subframe k+10.

In some scenarios, channel estimation in a subframe may be available only for a subset of PRBs (or certain subbands), e.g., DMRS based channel estimation. In this case, discontinued SRS transmission may apply to only the SRS subbands over which channel estimation is available and a WD 14 should transmit the SRS in the remaining subbands in the configured SRS subframes. In this case, the channel change over the subbands with available channel estimation is tested.

Figure 13:
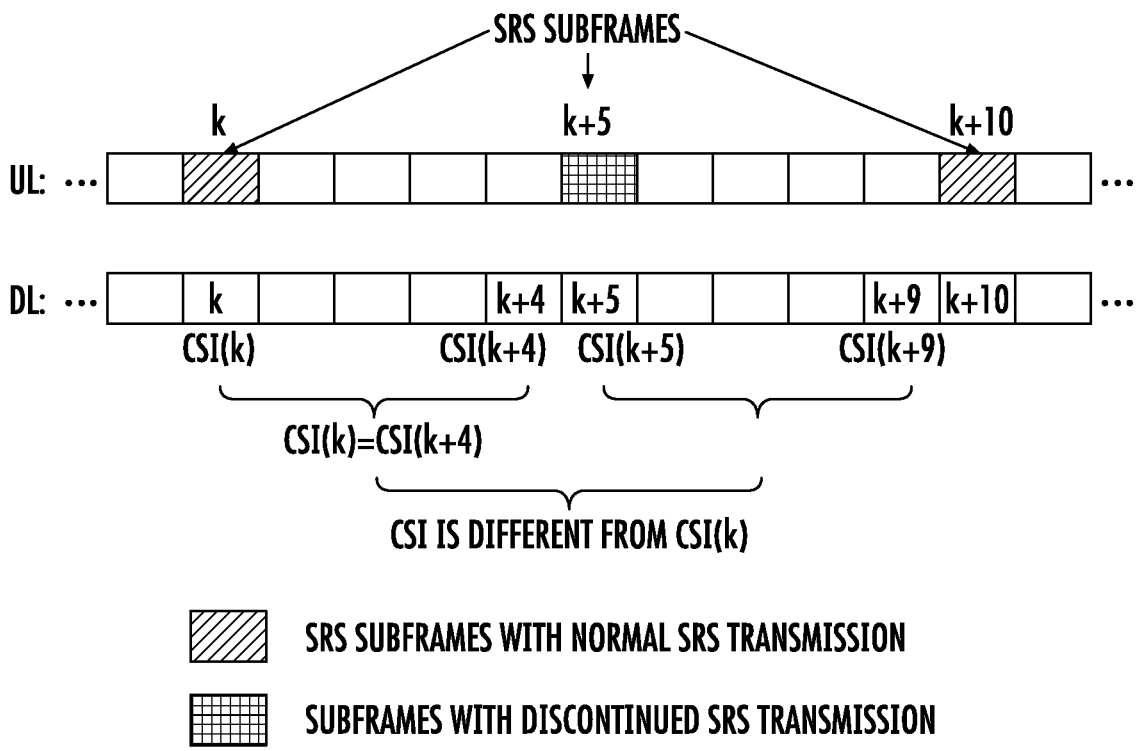
FIG. 13 is an example of SRS DTX based on CSI.

In another embodiment, instead of comparing the channel estimation directly as discussed above, CSI may be used to determine whether a channel has been changed or not. An example is shown in FIG. 13, where CSI(k)={RI(k), PMI(k), CQI(k)} is the wideband CSI estimated at subframe k. SRS is not transmitted in subframe k+5 since CSI(k+4)=CSI(k), i.e., there is no channel change. On the other hand, since CSI(k+5) or CSI(k+9)≠CSI(k), SRS is transmitted in subframe K+10. Again, the WD keeps channel state information CSI(k) as a reference if SRS is not transmitted in the following SRS subframe(s). If SRS is transmitted in the following SRS subframe, k+5, for example, then the channel reference is updated with a new channel estimation at subframe K+5, CSI(k+5), or at a subframe prior to subframe k+5 at which a channel state estimation is available. Similarly, when comparing CSI, the last CSI before the SRS subframe or any CSI between two SRS subframes can be used.

When subband CSI is estimated and letting CSI(k,f)={PMI(k,f), CQI(k,f)} be the subband CSI estimated at subframe k and subband f, discontinued SRS transmission may be determined in a subband by subband basis. In one embodiment, the SRS is not transmitted in a subframe if all subband CSIs have not been changed since the most recent SRS transmission, otherwise, the SRS is transmitted. In another embodiment, the SRS is not transmitted in a subband if the CSI of corresponding DL subband(s) has not been changed since the most recent SRS transmission in the same subband, otherwise, the SRS is transmitted in the subband.

In yet another embodiment, a timer may also be used to measure the time duration since the last SRS transmission. If the time duration exceeds a threshold, SRS is transmitted in the next SRS subframe regardless of channel changes.

Embodiment 2: Discontinued SRS Transmission Based on UL Data Buffer Status

Figure 14:
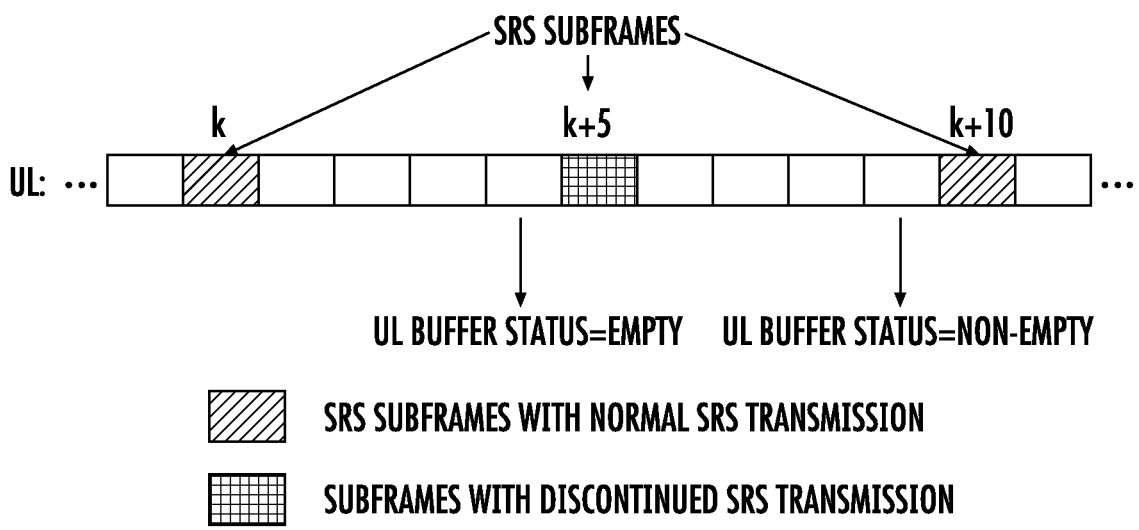
FIG. 14 is an example of SRS DTX based on uplink buffer status.

In this embodiment, a WD 14 is configured to transmit SRS periodically in the uplink. However, the SRS is not used by the network node 16 to estimate the DL channel, i.e., the SRS is used only for uplink channel estimation as typically done in a frequency division duplex (FDD) system. The network node 16 can still enable SRS discontinued transmission to save WD 14 battery power. In this case, before the next SRS transmission, the WD 14 checks the status of its UL data transmit buffers. If there is no data in the buffers, the WD 14 may not transmit SRS in the next SRS subframe. This is because if there is no data to transmit in the uplink, there is generally no need to transmit SRS for uplink channel estimation. An example is shown in FIG. 14.

In another embodiment, the uplink buffer status together with the time duration since the most recent SRS transmission is used for determining discontinued SRS transmission. When the uplink buffer is empty and the time since the last SRS transmission is below a threshold, the WD 14 doesn't transmit SRS in the next configured SRS subframe. Otherwise, SRS is transmitted according to the next SRS subframe. An example is shown in FIG. 14

A WD 14 may have multiple buffers/queues and each buffer/queue is associated with one or more UL logical channels. Each UL logical channel has a priority. The priority can be predefined or configured by the network node 16. In yet another embodiment, the priorities of UL logical channels may also be used to determine whether SRS is transmitted in the next SRS subframe. For example, if the priority of any UL logical channel is above a priority threshold, a WD 14 transmits SRS in the configured subframes regardless of the buffer status.

The discontinued SRS transmission in an SRS subframe can be transparent to the network node 16. In this case, detection is required at the network node 16 to determine whether SRS is transmitted by a WD. When a discontinued SRS transmission is detected, the network node 16 would not perform any other SRS related processing.

In another embodiment, discontinued SRS transmission in a SRS subframe may be dynamically signaled to the network node 16. The signalling can be carried over the uplink control channel, i.e., the physical uplink control channel (PUCCH). A PUCCH resource may be pre-allocated for a WD 14 in each configured SRS subframe. This may be used together with the detection to improve reliability of the detection.

Some benefits of the proposed solution include:
Conserving battery power;
Potentially increases SRS capacity. Given that there is a reasonable chance that some WDs will not transmit SRS in the configured sub-frame, more cyclic shifts may be assigned without degrading channel estimation quality too much; and
Reduced inter/intra-cell interference to other WDs in the uplink.

Figure 15:
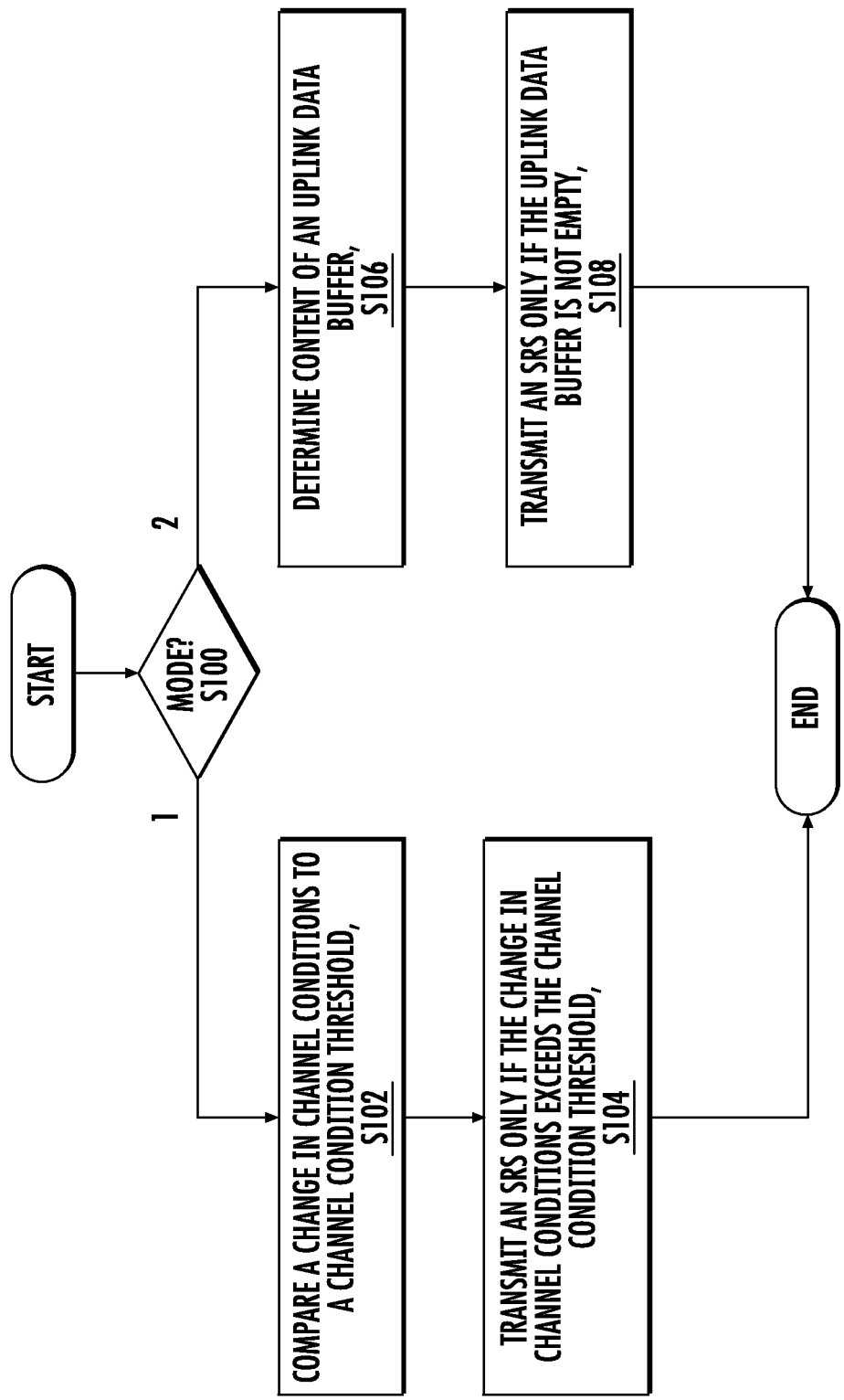
FIG. 15 is a flowchart of an exemplary process for discontinuous transmission of SRSs.

FIG. 15 is a flowchart of an exemplary process for discontinuous transmission of SRSs. The processing includes determining a mode of operation of the wireless device 14 (block S100). When operating in a first mode, the process includes comparing, via the channel condition comparator 18, a change in channel conditions to a channel condition threshold (block S102) and transmitting an SRS only if the change in channel conditions exceeds the channel condition threshold (block S104). When operating in a second mode of operation, the process includes determining, via the content determiner 30, a content of an uplink data buffer (block S106) and transmitting an SRS only if the uplink data buffer is not empty (block S108).

Figure 16:
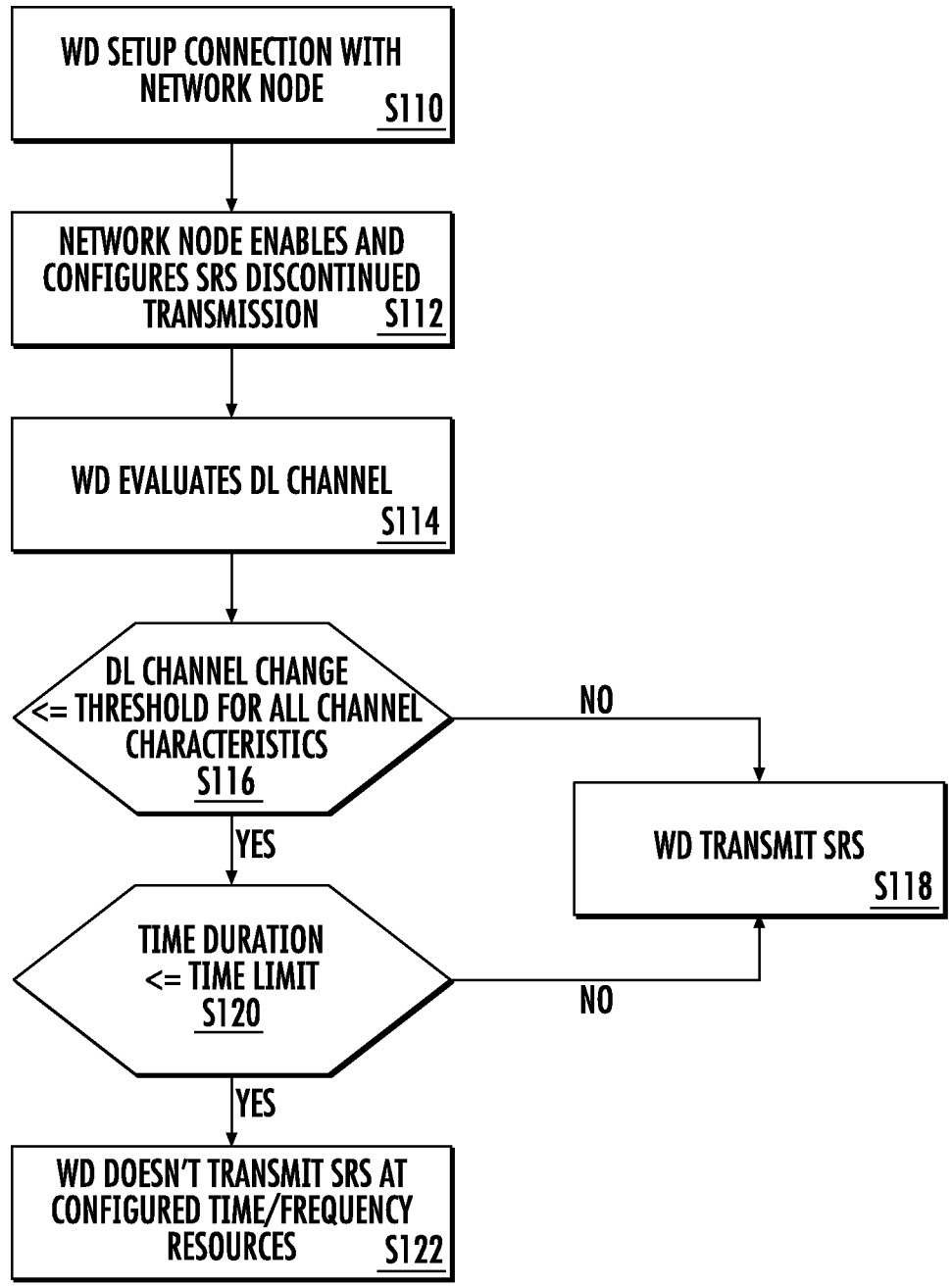
FIG. 16 is a flowchart of an exemplary process for discontinuous transmission based on whether a change in channel conditions exceeds a threshold.

FIG. 16 is a flowchart of an exemplary process for discontinuous transmission based on whether a change in channel conditions exceeds a threshold. The process includes setting up a connection between the WD 14 and a network node 16 (block S110). The network node 16 enables and configures SRS discontinued transmission (block S112). The WD 14 evaluates the channel (block S114). If a change in channel conditions is not less than or equal to a channel conditions threshold (block S116), as determined by the channel condition comparator 18, the WD 14 transmits an SRS (block S118). Otherwise, if the time since the last SRS transmission has exceeded a time threshold (block S120), the WD 14 transmits the SRS via transceiver 34 (block S118). Otherwise, the WD 14 does not transmit the SRS at configured time/frequency resources (block S122).

Figure 17:
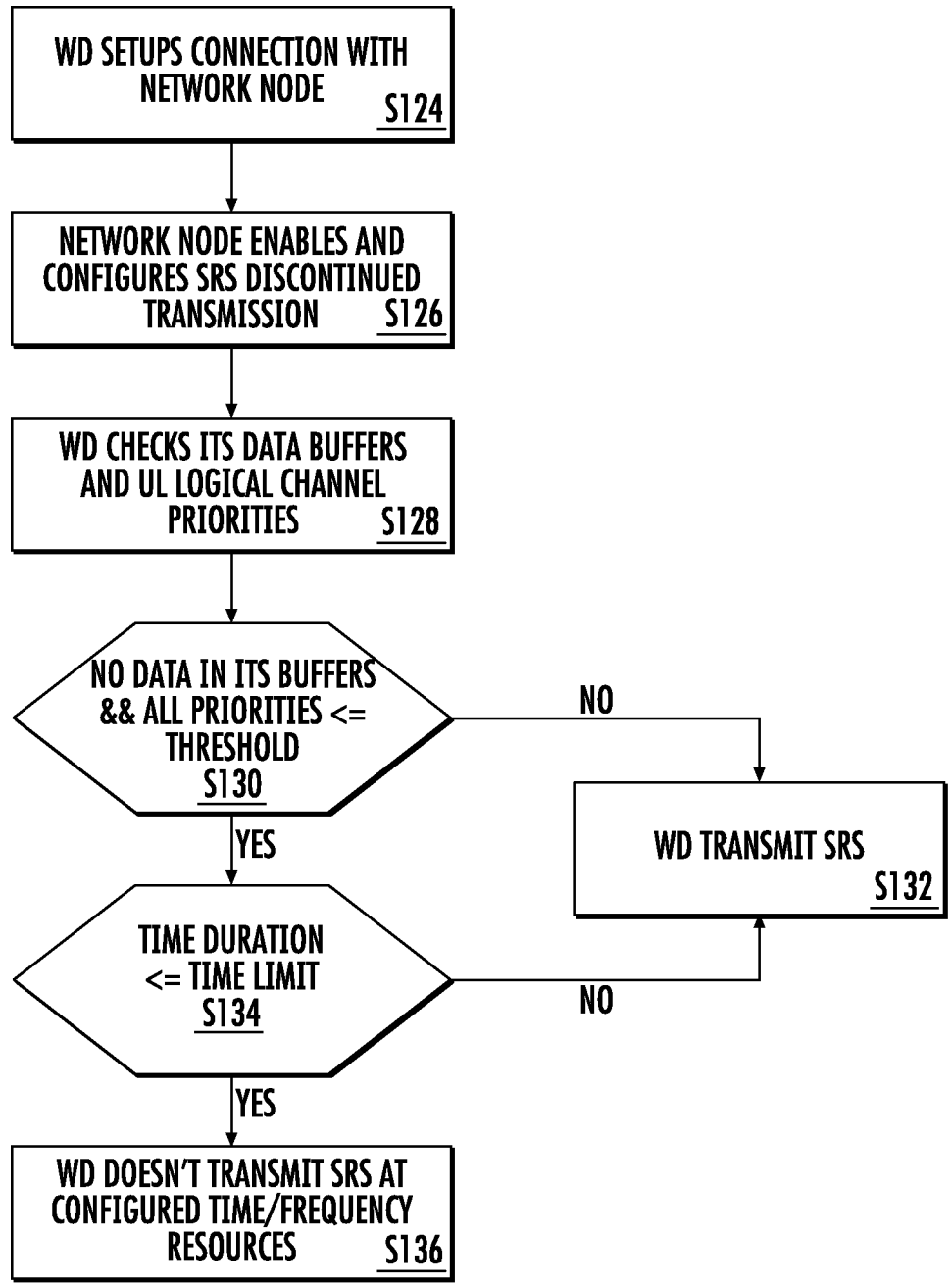
FIG. 17 is a flowchart of an exemplary process for discontinuous transmission based on whether an uplink data buffer is empty and whether a logical uplink channel priority exceeds a threshold.

FIG. 17 is a flowchart of an exemplary process for discontinuous transmission based on whether an uplink data buffer is empty and whether a logical uplink channel priority exceeds a threshold. The process includes setting up a connection between the WD 14 and the network node 16 (block S124). The network node 16 enables and configures SRS discontinued transmission (block S126). The WD 14 checks, via content determiner 30, the UL data buffers and logical channel priorities (block S128). If there is data in the buffers or a logical channel priority exceeds a threshold (block S130), then the WD 14 transmits an SRS (block S132). Otherwise, if the time since the last SRS transmission is greater than a time threshold (block S134), the WD 14 transmits the SRS via the transceiver 34 (block S132). Otherwise, the WD 14 does not transmit SRS at configured time/frequency resources (block S136).

Thus, in some embodiments, a method of discontinuous transmission, DTX, of sounding reference signals, SRSs, by a wireless device 14 served by a network node 16 in a wireless network is provided. When operating in a first mode of operation, the method includes comparing a change in channel conditions to a channel condition threshold and transmitting an SRS only if the change in channel conditions exceeds the channel condition threshold. When operating in a second mode of operation, the method includes determining a content of an uplink data buffer and transmitting an SRS only if the uplink data buffer is not empty.

In some embodiments, channel conditions involved in the comparison include a channel condition measured in a first previous subframe and a channel condition measured in a second previous subframe subsequent to the first previous subframe. In some embodiments, the change in channel conditions is a difference between the channel condition measured in the first previous subframe and the channel condition measured in the second previous subframe. In some embodiments, the channel conditions in the first and second previous subframes are measured based on a same set of downlink reference symbols. In some embodiments, the transmitting of the SRS only occurs if a time since a last SRS transmission exceeds a time threshold. In some embodiments, the time threshold and the channel condition threshold are signaled from the network node 16. In some embodiments, a measure of the channel conditions is at least one of a channel quality indicator, a rank indictor and a precoding matrix indicator. In some embodiments, the SRS transmission occurs only when one of there is data in the uplink buffer and a time since a last SRS transmission exceeds a time threshold. In some embodiments, the SRS transmission occurs when an uplink logical channel priority exceeds a priority threshold.

In some embodiments, a wireless device 14 configured for discontinuous transmission, DTX, of sounding reference signals, SRSs, the wireless device 14 served by a network node 16 in a wireless network, is provided. The wireless device 14 includes processing circuitry configured to operate in at least one of two modes. When operating in a first mode of operation, the processor is configured to compare a change in channel conditions to a channel condition threshold and transmit an SRS only if the change in channel conditions exceeds the channel condition threshold. When operating in a second mode of operation, the processor is configured to determine a content of an uplink data buffer and transmit an SRS only if the uplink data buffer is not empty.

In some embodiments, channel conditions involved in the comparison include a channel condition measured in a first previous subframe and a channel condition measured in a second previous subframe subsequent to the first previous subframe. In some embodiments, the change in channel conditions is a difference between the channel condition measured in the first previous subframe and the channel condition measured in the second previous subframe. In some embodiments, the channel conditions in the first and second previous subframes are measured based on a same set of downlink reference symbols. In some embodiments, the transmitting of the SRS only occurs if a time since a last SRS transmission exceeds a time threshold. In some embodiments, the time threshold and the channel condition threshold are signaled from the network node 16. In some embodiments, a measure of the channel conditions is at least one of a channel quality indicator, a rank indictor and a precoding matrix indicator. In some embodiments, the SRS transmission occurs only when one of there is data in the uplink buffer and a time since a last SRS transmission exceeds a time threshold. In some embodiments, the SRS transmission occurs when an uplink logical channel priority exceeds a priority threshold.

In some embodiments, a wireless device 14 configured for discontinuous transmission, DTX, of sounding reference signals, SRSs, the wireless device 14 served by a network node 16 in a wireless network, is provided. The wireless device 14 includes at least one of a channel condition comparator module configured to compare a change in channel conditions to a channel condition threshold and a content determiner module configured to determine a content of an uplink data buffer. The wireless device 14 also includes a transceiver module configured to one of transmit an SRS only if the change in channel conditions exceeds the channel condition threshold, and transmit an SRS only if the uplink data buffer is not empty.

According to this aspect, in some embodiments, the transmitting of the SRS only occurs if a time since a last SRS transmission exceeds a time threshold. In some embodiments, the time threshold and the channel condition threshold are signaled from the network node 16. In some embodiments, the SRS transmission occurs only when one of there is data in the uplink buffer or a time since a last SRS transmission exceeds a time threshold. In some embodiments, the SRS transmission occurs when an uplink logical channel priority exceeds a priority threshold.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of discontinuous transmission, DTX, of sounding reference signals, SRSs, by a user equipment served by a base station in a wireless network, the method comprising:
   when operating in a first mode of operation:
      determining a change in channel conditions between a first channel estimation performed before a most recent SRS transmission and a second channel estimation performed after the most recent SRS transmission;
      comparing the change in channel conditions to a channel condition threshold; and
      transmitting an SRS only when the change in channel conditions exceeds the channel condition threshold; and
   when operating in a second mode of operation:
      determining a content of an uplink data buffer; and
      transmitting an SRS when the uplink data buffer is not empty.

2. The method of claim 1, wherein the transmitting of the SRS occurs when a time since a last SRS transmission exceeds a time threshold.

3. The method of claim 2, wherein the time threshold and the channel condition threshold are signaled from the base station.

4. The method of claim 1, wherein an indicator of the channel conditions is at least one of a channel quality indicator, a rank indictor and a precoding matrix indicator.

5. The method of claim 1, wherein the SRS transmission occurs when one of:
   there is data in the uplink data buffer; and
   a time since a last SRS transmission exceeds a time threshold.

6. The method of claim 1, wherein the SRS transmission occurs when an uplink logical channel priority exceeds a priority threshold.

7. A user equipment configured for discontinuous transmission, DTX, of sounding reference signals, SRSs, the user equipment served by
   a base station in a wireless network, the user equipment comprising:
      processing circuitry configured to:
         when operating in a first mode of operation:
            determine a change in channel conditions between a first channel estimation performed before a most recent SRS transmission and a second channel estimation performed after the most recent SRS transmission;
            compare the change in channel conditions to a channel condition threshold; and
            transmit an SRS when the change in channel conditions exceeds the channel condition threshold; and
         when operating in a second mode of operation:
            determine a content of an uplink data buffer; and
            transmit an SRS when the uplink data buffer is not empty.

8. The user equipment of claim 7, wherein the transmitting of the SRS occurs when a time since a last SRS transmission exceeds a time threshold.

9. The user equipment of claim 8, wherein the time threshold and the channel condition threshold are signaled from the base station.

10. The user equipment of claim 7, wherein an indicator of the channel conditions is at least one of a channel quality indicator, a rank indictor and a precoding matrix indicator.

11. The user equipment of claim 7, wherein the SRS transmission occurs when one of:
   there is data in the uplink data buffer; and
   a time since a last SRS transmission exceeds a time threshold.

12. The user equipment of claim 7, wherein the SRS transmission occurs when an uplink logical channel priority exceeds a priority threshold.

13. A user equipment configured for discontinuous transmission, DTX, of sounding reference signals, SRSs, the user equipment served by a base station in a wireless network, the user equipment comprising:
   processing circuitry configured to:
      determine a change in channel conditions between a first channel estimation performed before a most recent SRS transmission and a second channel estimation performed after the most recent SRS transmission; and
      compare the change in channel conditions to a channel condition threshold; and
   a transceiver module configured to transmit an SRS when the change in channel conditions exceeds the channel condition threshold.

14. The user equipment of claim 13, wherein the transmitting of the SRS occurs when a time since a last SRS transmission exceeds a time threshold.

15. The user equipment of claim 14, wherein the time threshold and the channel condition threshold are signaled from the base station.

16. The user equipment of claim 13, wherein the SRS transmission occurs when one of:
   there is data in an uplink data buffer; and
   a time since a last SRS transmission exceeds a time threshold.

17. The user equipment of claim 13, wherein the SRS transmission occurs when an uplink logical channel priority exceeds a priority threshold.

* * * * *